(12) United States Patent
Kabra et al.

(10) Patent No.: US 10,528,534 B2
(45) Date of Patent: \*Jan. 7, 2020

(54) METHOD AND SYSTEM FOR DEDUPLICATING DATA

(71) Applicant: International Business Machines Corporation, Armonk, NY (US)

(72) Inventors: Namit Kabra, Hyderabad (IN); Yannick Saillet, Stuttgart (DE)

(73) Assignee: International Business Machines Corporation, Armonk, NY (US)

(\*) Notice: Subject to any disclaimer, the term of this patent is extended or adjusted under 35 U.S.C. 154(b) by 105 days.

This patent is subject to a terminal disclaimer.

(21) Appl. No.: 15/824,012

(22) Filed: Nov. 28, 2017

(65) Prior Publication Data

US 2018/0089235 A1 Mar. 29, 2018

Related U.S. Application Data

(63) Continuation of application No. 15/276,245, filed on Sep. 26, 2016.

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
None
See application file for complete search history.

(56) References Cited

U.S. PATENT DOCUMENTS 7,836,004 B2 11/2010 Roth et al.
8,166,000 B2 4/2012 Labrie et al.
(Continued)

FOREIGN PATENT DOCUMENTS

CN 101201844 A 6/2008
WO WO2016/048263 A1 3/2016

OTHER PUBLICATIONS

"Data Matching", SQL Server 2016, http://msdn,microsoft.com/en-IN/library/hh213071.aspx, Updated Oct. 2, 2012, 4 pages.
(Continued)

*Primary Examiner* — Bai D Vu
(74) *Attorney, Agent, or Firm* — Stephen R. Tkacs; Stephen J. Walder, Jr.; Robert C. Bunker (57) ABSTRACT

A mechanism is provided for deduplicating a set of records of data. The mechanism identifies a subset of records each having one or more invalid attribute values. For each invalid attribute value of a given attribute the mechanism determines one or more associated valid candidates of attribute values of the given attribute using the set of records. For each record of the subset of records the mechanism replaces the one or more invalid attribute values by one or more combinations of the determined valid candidates of attribute values, resulting in a modified set of records. The mechanism selects a subset of records of the modified set of records that satisfy a consistency condition on the attribute values of each record. The mechanism deduplicates the selected subset of records of the modified set of records responsive to determining the subset of records comprises more than one record.

11 Claims, 6 Drawing Sheets

(56) References Cited

U.S. PATENT DOCUMENTS

| | | |
|---|---|---|
| 8,171,001 B2 | 5/2012 | Roth et al. |
| 8,799,235 B2 | 8/2014 | Kacher et al. |
| 8,812,411 B2 | 8/2014 | Malka et al. |
| 9,298,385 B2 | 3/2016 | Baldwin et al. |
| 2015/0066861 A1* | 3/2015 | Ritto .................. G06F 16/21 707/661 |
| 2015/0278241 A1 | 10/2015 | Bates-Haus et al. |
| 2015/0370495 A1 | 12/2015 | Georgiev |
| 2016/0085807 A1 | 3/2016 | Karanam et al. |
| 2016/0092479 A1 | 3/2016 | Kabra et al. |
| 2016/0092494 A1 | 3/2016 | Kabra et al. |

OTHER PUBLICATIONS

Agarwala, Richa et al., "Oracle Warehouse Builder Data Modeling, ETL, and Data Quality Guide", Chapter 23 Matching, Merging, and Dedupiication, http://docs.oracle.com/cd/E11882_01/owb.112/e10935/match_merge.htm#CHDGGHEA, Sep. 2011, 32 pages.

Chandramohan, Prashant, "Combat of Duplicate Data, Who is the Survivor?", MDM—A Geeks Point of View, http://www.mdmgeek.com/2011/12/20/combat-of-duplicate-data-who-is-the-survivor/, Dec. 20, 2011, 5 pages.

Vertido, Joseph, "A Guide to Better Survivorship—A Melissa Data Approach", The Data Quality Authority Blog, http://blog.melissadata.com/data-quality-authority/2012/10/a-guide-to-better-survivorship—a-melissa-data-approach.html, Oct. 29, 2012, 2 pages.

List of IBM Patents or Patent Applications Treated as Related, Nov. 28, 2017, 2 pages.

\* cited by examiner

| First Name | Last | Address |
|---|---|---|
| Akshay | Naidu | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |

| City | State | Zip | Phone | Tax-ID |
|---|---|---|---|---|
|  | AP |  | 040-23232323 | AFKPD0269 |
| Hyderabad | MP | 500081 | 040-2323232 | AFKPN0269A |
| Hyderabad | AP | 50081 | 011-45454545 | AFKPD0269A |
| Hyderabad | AP | 50081 | 011-45454545 | AFKPD0269A |

Fig. 3a

| First Name | Last | Address |
|---|---|---|
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |

| City | State | Zip | Phone | Tax-ID |
|---|---|---|---|---|
| Hyderabad | AP | 500081 | 040-23232323 | AFKPN0269A |
| Hyderabad | AP | 500081 | 040-23232323 | AFKPD0269A |
| Hyderabad | AP | 500081 | 011-45454545 | AFKPN0269A |
| Hyderabad | AP | 500081 | 011-45454545 | AFKPD0269A |
| Hyderabad | MP | 500081 | 040-23232323 | AFKPN0269A |
| Hyderabad | MP | 500081 | 040-23232323 | AFKPD0269A |
| Hyderabad | MP | 500081 | 011-45454545 | AFKPN0269A |
| Hyderabad | MP | 500081 | 011-45454545 | AFKPD0269A |
| Hyderabad | AP | 500081 | 040-23232323 | AFKPN0269A |
| Hyderabad | AP | 500081 | 040-23232323 | AFKPD0269A |
| Hyderabad | AP | 500081 | 011-45454545 | AFKPN0269A |
| Hyderabad | AP | 500081 | 011-45454545 | AFKPD0269A |
| Hyderabad | MP | 500081 | 040-23232323 | AFKPN0269A |
| Hyderabad | MP | 500081 | 040-23232323 | AFKPD0269A |
| Hyderabad | MP | 500081 | 011-45454545 | AFKPN0269A |
| Hyderabad | MP | 500081 | 011-45454545 | AFKPD0269A |

Fig. 3b

| First Name | Last | Address |
|---|---|---|
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naidu | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |

| City | State | Zip | Phone | Tax-ID | |
|---|---|---|---|---|---|
| Hyderabad | AP | 500081 | 040-23232323 | AFKPN0269A | |
| Hyderabad | AP | 500081 | 040-23232323 | AFKPD0269A | |
| Hyderabad | AP | 500081 | 011-45454545 | AFKPN0269A | 306A |
| Hyderabad | AP | 500081 | 011-45454545 | AFKPD0269A | 306B |
| Hyderabad | MP | 500081 | 040-23232323 | AFKPN0269A | 306C |
| Hyderabad | MP | 500081 | 040-23232323 | AFKPD0269A | 306D |
| Hyderabad | MP | 500081 | 011-45454545 | AFKPN0269A | 306E |
| Hyderabad | MP | 500081 | 011-45454545 | AFKPD0269A | 306F |
| Hyderabad | AP | 500081 | 040-23232323 | AFKPN0269A | |
| Hyderabad | AP | 500081 | 040-23232323 | AFKPD0269A | |
| Hyderabad | AP | 500081 | 011-45454545 | AFKPN0269A | 306G |
| Hyderabad | AP | 500081 | 011-45454545 | AFKPD0269A | 306H |
| Hyderabad | MP | 500081 | 040-23232323 | AFKPN0269A | 306I |
| Hyderabad | MP | 500081 | 040-23232323 | AFKPD0269A | 306J |
| Hyderabad | MP | 500081 | 011-45454545 | AFKPN0269A | 306K |
| Hyderabad | MP | 500081 | 011-45454545 | AFKPD0269A | 306L |

| First Name | Last | Address |
|---|---|---|
| Akshay | Naidu | 21 Krishna Apts MG Road Srinagar Colony |
| Akshay | Naidu | 21 Krishna Apts MG Road Srinagar Colony |
| Akshay | Naide | 21 Krishna Apts MG Road Srinagar Colony |
| Akshay | Naide | 21 Krishna Apts MG Road Srinagar Colony |

| City | State | Zip | Phone | Tax-ID | |
|---|---|---|---|---|---|
| Hyderabad | AP | 500081 | 040-23232323 | AFKPN0269A | 308A |
| Hyderabad | AP | 500081 | 040-23232323 | AFKPD0269A | 308B |
| Hyderabad | AP | 500081 | 040-23232323 | AFKPN0269A | 308C |
| Hyderabad | AP | 500081 | 040-23232323 | AFKPD0269A | 308D |

| First Name | Last | Address |
|---|---|---|
| Akshay | Naidu | 21 Krishna Apts MG Road Srinagar Colony |

| City | State | | Phone | Tax-ID | |
|---|---|---|---|---|---|
| Hyderabad | AP | 500081 | 040-23232323 | AFKPN0269A | 308A |

Fig. 3e

METHOD AND SYSTEM FOR DEDUPLICATING DATA

BACKGROUND

The present invention relates to the field of digital computer systems, and more specifically, to a mechanism for deduplicating a set of records.

Deduplicating data records representing the same entity represents a challenging task. In particular, recognizing which different records with potentially slightly different content represent the same entity and being able to merge those duplicated records in a single golden record is a critical data quality task.

The deduplication process is made up of two phases: the match phase and the merge phase. During the match phase, the system scans all records of a table and tries to recognize groups of records that represent the same entity. During the merge phase, the system tries to build a single golden record merging information from the different duplicated records. Since the records to merge may contain different and even conflicting information, the merging process becomes challenging.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer implemented method is provided for deduplicating a set of records of data, each record of the set of records having a set of attributes. The method comprises identifying a subset of records of the set of records each having one or more invalid attribute values. The method further comprises determining for each invalid attribute value of a given attribute of the subset of the set of records one or more associated valid candidates of attribute values of the given attribute using the set of records. The method further comprises, for each record of the subset of records of the set of records, replacing the one or more invalid attribute values by one or more combinations of the determined valid candidates of attribute values resulting in a modified set of records; selecting a subset of records of the modified set of records that satisfy a consistency condition on the attribute values of each record; and, deduplicating or merging the subset of records of the modified set of records responsive to determining the subset of records comprises more than one record.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3a-3e are text diagrams depicting another example of a set of records at various stages of processing in accordance with an illustrative embodiment.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The set of records may for example comprise records resulting from a data deduplication algorithm and may represent one or more duplicate record groups. Each duplicate record group consists of multiple records that are duplicates or they represent the same entity. In other terms, the set of records may be the result of matching one or more data tables, wherein the matching comprises determining which data records possibly represent a single entity.

Since the records to merge may contain different and even conflicting information, the present method may provide the breed record (survivor) from each of this record group in an accurate manner. The replacing step may refer to at least part of the merging process.

For example, the illustrative embodiments may collect or infer as many data quality rules as possible for the data set to deduplicate and then use these data quality rules (e.g., during the data merging (survivorship) process) in order to eliminate the combination of field or attribute values that would lead to a data quality problem. The illustrative embodiments may have the advantage of improving the deduplication of data records using an accurate selection of records to be deduplicated.

Another advantage may be that the illustrative embodiments may improve the merge algorithm of the deduplication process to take into consideration the data quality aspect and ensure that more records can be automatically merged without the need to define new rules.

Some examples of data consistency rules are the following:

Does the data have the correct format?

Does the data have correct data domain?

Are rules/criteria linking content of various data fields or attributes met?

Using consistency conditions as conditions or rules that preexist (e.g., for another purpose such as data quality purpose) may prevent writing those conditions or rules specifically for the deduplication or survivorship process, which costs resources to develop and test. In another example, the consistency conditions defined for the deduplication process may be combined with the existing data quality rules, in order to further increase the quality of the result, or to reduce the number of deduplication/survivorship rules.

The deduplicating step may comprise executing a merging algorithm using predefined merging rules on the subset of records of the modified set of records.

According to one embodiment, the determining for a given invalid attribute value one or more associated valid candidates of attribute values comprises: selecting records of the set of records having the same super key as the record comprising the given invalid attribute value; and, performing the determining using selected records. This may be advantageous as it may save processing time that would otherwise be required for processing all records with no conditions on the relation to the given record. In another example, a matching algorithm may be used to select the records that would correspond to the given record and thus may be used to determine the valid candidates of the attribute values. Two records having the same super key are records identified as being different or same representations of the same entity.

According to one embodiment, the method further comprises disregarding the inconsistent records by removing them or skipping them for performing the deduplication. This may for example be performed by creating a new table assuming for example that the set of records for a first table, the new table may comprise only consistent records and the first table may for example be deleted. This may save processing resources such as storage resources.

According to one embodiment, the method further comprises: before the identifying of the subset of records of the set of records, comparing for each record of the set of records the attribute values of the super key of the record with predefined reference values of the super key and correcting the attribute values in case of on an unsuccessful comparison. This may further improve the deduplication process in that it may further increase the accuracy of the identified golden records since non-corrected records may lead to a wrong detection of the golden record. In another example, an unsuccessful comparison may indicate that the attribute values are invalid and the replacement may be performed for them as described above.

According to one embodiment, the identifying of the subset of records of the set of records comprises: retrieving heuristic rules (or rules) to determine likelihood that an attribute value is an invalid value; applying the heuristic rules on each of the attribute values. According to one embodiment, the heuristic rules are generated for performing a data quality analysis of the set of records.

These embodiments may be advantageous as it may make use of existing systems and data quality rules for improving the deduplication process. This may save time for redefining rules and, thus, may be seamlessly integrated in existing systems without undue burden.

According to one embodiment, the method further comprises: providing a reference dataset; determining association relationships among attribute values of the reference dataset, wherein the consistency condition comprises a condition for fulfilling one of the association relationships. This may further improve the deduplication process by using reliable consistency conditions.

According to one embodiment, the reference dataset comprises the remaining non-identified subset of records of the set of records. This may further increase the accuracy of the illustrative embodiments compared to the case of using an external sample that may not reflect the real relationship between the attribute values.

According to one embodiment, the consistency condition is a selected rule of a set of heuristic rules on multiple attributes of the set of attributes.

In one example, the heuristic rules may for example be obtained by gathering all rules that can be used about the dataset:

(a) lookup if there are rules that have been defined by the user for this dataset;

(b) lookup if profiling information/data classifications allow to infer domain validation rules for each column or attribute;

(c) optionally run data mining algorithms or other statistical methods to detect eventual unknown relationships between the columns; and, (d) optionally pass the records through validation service for validation of the data in entirety.

When for example merging two records, all possible combinations of potential merges (col1 coming from this row or from that row, etc. . . . ) may be generated.

All possible combinations go through all data quality rules collected in (a)-(d) for that dataset (or the set of records) in order to select for example a golden record that may be defined as the record violating the less rules compared to the other records defined by the different combinations. If more than one qualifies, further criteria like timestamp or the like may be used.

According to one embodiment, the one or more associated valid candidates attribute values comprise all valid attribute values of the given attribute in the set of records. This may increase the accuracy of the present method by performing the deduplication starting or using a large sample of combinations resulting from the all valid attribute values. This is in contrast to the case of using only part of valid attribute values.

According to one embodiment, the one or more associated valid candidates of attribute values comprise a selected portion of valid attribute values of the given attribute in the set of records. The selected portion of valid attribute values may be randomly selected among the valid attribute values. This may save processing resources that would otherwise be required for processing all possible valid attribute values.

According to one embodiment, the set of records comprises duplicate records only. For example, the set of records may be the result or output of a matching algorithm. In other terms, the set of records are records of the same entity or having the same super key. In this case, the present method may comprise a survivorship process for identifying at the end of the method the survivor or golden candidate among the duplicate candidates. This embodiment may seamlessly be integrated in existing systems to improve the deduplication process.

According to one embodiment, the invalid attribute value comprises one of: a blank value; null value; out of range value; and wrong type value, value violating a predefined domain condition; values violating user defined data quality rules; infrequent value; an outlier value.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of" and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
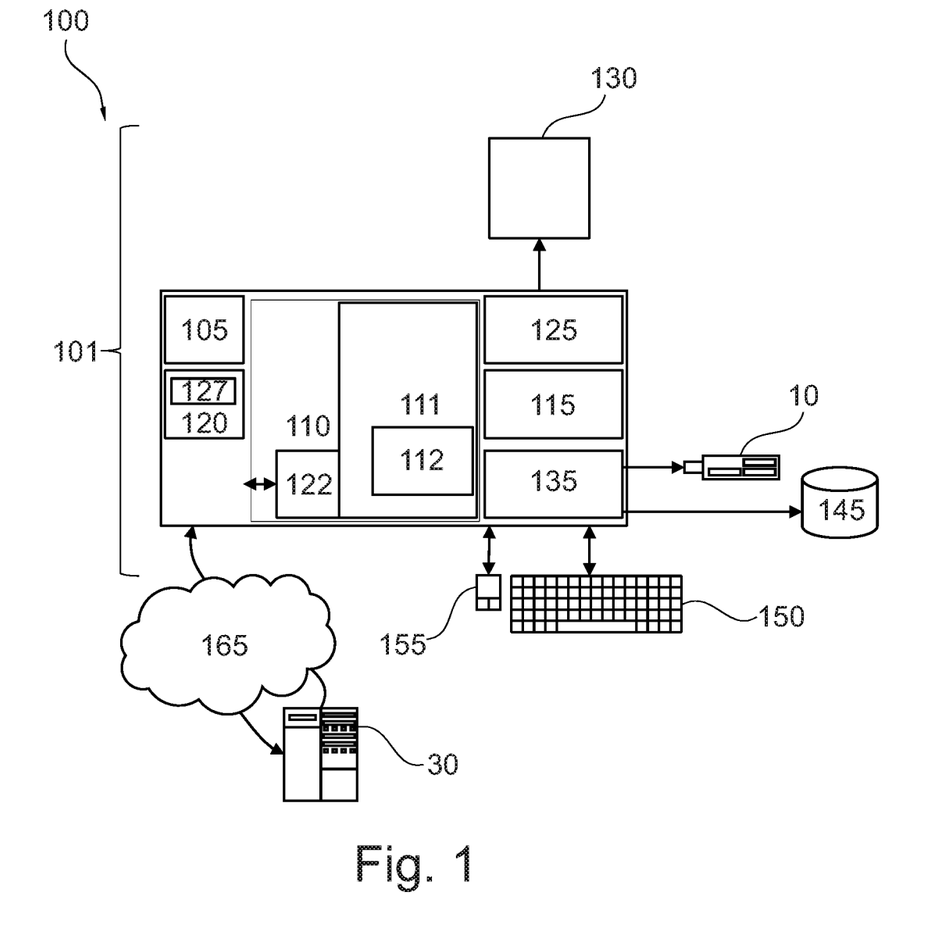
FIG. 1 represents a general computerized system, suited for implementing a mechanism for deduplicating data records in accordance with an illustrative embodiment.

FIG. 1 represents a general computerized system, suited for implementing a mechanism for deduplicating data records in accordance with an illustrative embodiment.

It will be appreciated that the methods described herein are at least partly non-interactive and automated by way of computerized systems, such as servers or embedded systems. In exemplary embodiments though, the mechanisms described herein can be implemented in a (partly) interactive system. These mechanisms can further be implemented in software 112, 122 (including firmware 122), hardware (processor) 105, or a combination thereof. In exemplary embodiments, the mechanisms described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112, e.g., instructions to manage databases such as a database management system. The memory 110 may further comprise a query optimizer (not shown). The query optimizer may comprise instructions, e.g., software instructions, that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, this may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art.

The system 100 can further include a display controller 125 coupled to a display 130. In exemplary embodiments, the system 100 can further include a network interface (not shown) for coupling to a network 165. The network 165 can be an IP-based network for communication between the computer 101 and any external server, client and the like via a broadband connection. The network 165 transmits and receives data between the computer 101 and external systems 30, which can be involved to perform part or all of the mechanisms discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a personal computer (PC), workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the mechanisms described herein are implemented in software 112, as is shown in FIG. 1, the mechanisms can be stored on any computer readable medium, such as storage 120, for use by or in connection with any computer related system or method. The storage 120 may comprise disk storage such as HDD storage.

The storage 120 may comprise at least one data table (or data set) 127. For example, the software 112 may receive (automatically or upon request) as input the data table 127, or may download the data table 127 from storage 120 or memory 110.

The data table 127 may comprise one or more columns, wherein each column is represented by a respective attribute. The rows or records of the data table 127 may comprise values of the attributes.

The term "data table" or data set as used herein refers to a collection of data that may be presented in tabular form.

Each column in the data table may represent a particular variable or attribute. Each row in the data table may represent a given member, record or entry of the data table.

Figure 2:
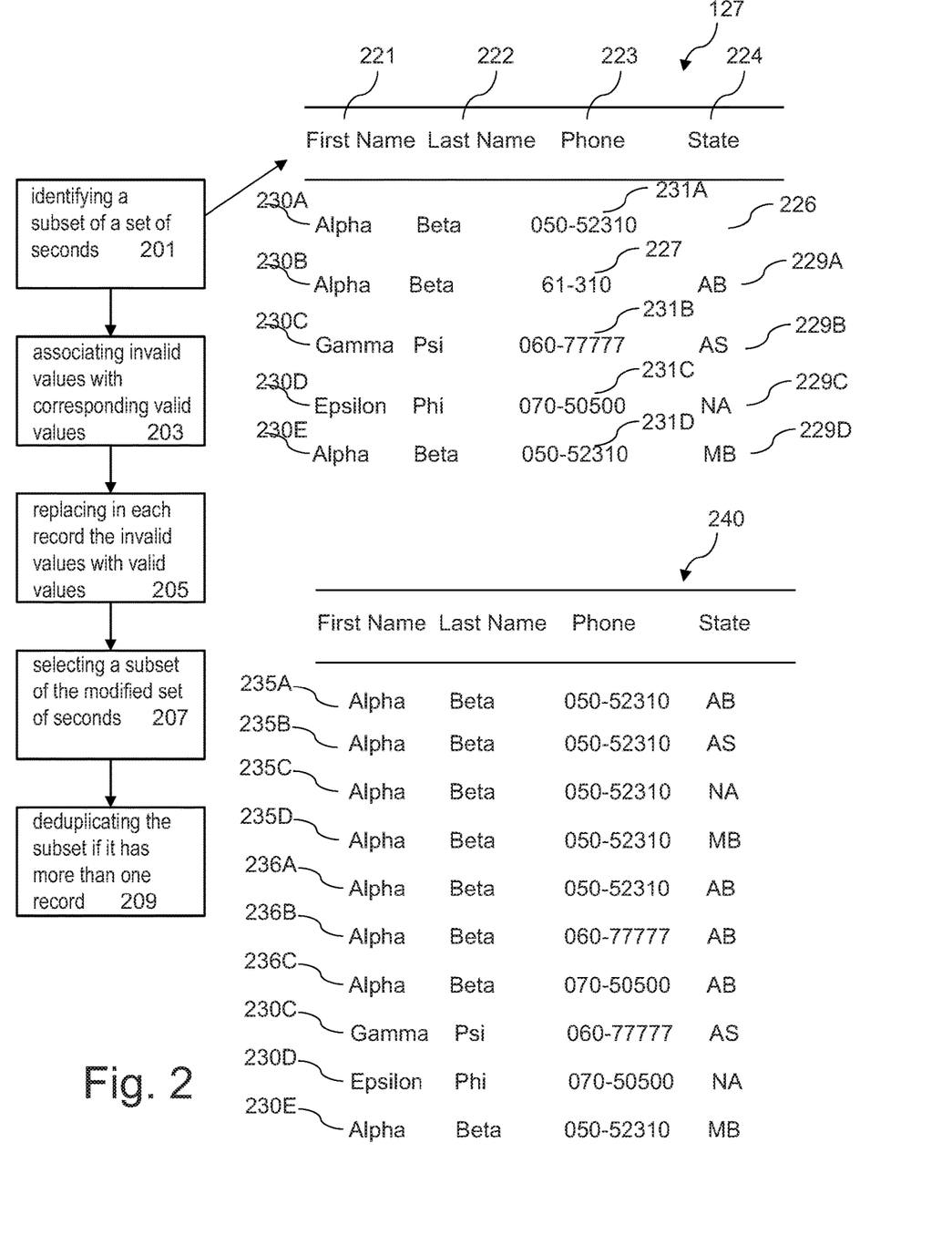
FIG. 2 is a flowchart of operation of a mechanism for de-duplicating a first set of data records in accordance with an illustrative embodiment.

FIG. 2 is a flowchart of operation of a mechanism for de-duplicating a first set of data records that may comprise the records of data table 127 and may be referred to herein by reference number 127 in accordance with an illustrative embodiment. FIG. 2 shows, for purpose of illustration, the first set of records 127 as having attributes 221-224.

For example, the first set of records 127 may be received from one or more data sources, for example. In another example, the first set of records 127 may be accessed in the storage 120 as soon as they are stored or upon request to access them.

In step 201, a subset of records 230A-230B of the first set of records 127 may be identified or selected. Each record of the subset of records 230A-230B of the first set of records 127 has one or more invalid attribute values. An invalid attribute value may for example comprise an empty value, blank value, NULL value, corrupted value, etc. The subset of records may comprise part or all of records of the first set of records 127.

The identification of the subset of records 230A-230B may for example be performed by retrieving one or more existing heuristic rules to determine a likelihood that an attribute value is an invalid value. The heuristic rules are applied on each of the attribute values. This may for example be done by processing record by record and applying the heuristic rule to each attribute value in the record.

A heuristic rule may for example comprise a rule that evaluates a degree of a match between the attribute value when compared to a reference value of that attribute. In another example, a heuristic rule may comprise a rule that compares the type of the attribute value with an expected type of that attribute.

Using the example of FIG. 2, attribute value 226 of attribute "state" 224 may be identified as invalid as it is a blank value. Also, attribute value 227 of attribute "phone" 223 may be identified as invalid as it has a format different from phone reference or standard format.

For each invalid attribute value of a given attribute of the subset of the first set of records 127 it may be determined in step 203 one or more associated valid candidates of attribute values of the given attribute using the first set of records 127. For example, if for a given attribute in a record of the first set of records, the attribute value is invalid, the valid value of that given attribute may be found in one or more other records of the first set of records 127. In general, in the present disclosure finding multiple valid values may be possible and they are called "candidates" as only one valid value of them may fit together with the other attribute values in a given record.

Using the example of FIG. 2, the invalid attribute value 226 may be associated with valid attribute values 229A-D. And the invalid attribute value 227 may be associated with valid attribute values 231A-D. In another example, the valid attribute values may be determined among records having the same entity or having the same super key as the records 230A-B. That is, the invalid attribute value 226 may be associated with valid attribute values 229A and 229D, because attribute values 229B and 229C belong to an entity, e.g., "Gamma" and "Epsilon," that is different from entity "Alpha." The invalid attribute value 227 may be associated with valid attribute values 231A and 231D.

In another example, the association of the invalid attribute value of a given record e.g. 230A may be performed using the records that have the same super key as the record 230A.

In the example of FIG. 2, those records may be record 230B and 230E. This may save time of processing all records. In this case the invalid attribute value 226 may be associated with valid attribute values 229A and 229D as they have the same super key being first and last names 221 and 222.

For each record of the subset of records 230A-B, the one or more invalid attribute values 226-227 may be replaced in step 205 by one or more combinations of the determined valid candidates of attribute values. This may result in a second set of records 240 as illustrated in FIG. 2. The second set of records 240 may be a modified first set of records 127, for example obtained by modifying the content of the first set of records 127.

Using the example of FIG. 2, the invalid attribute value 226 may be replaced by four valid attribute values 229A-D which may lead to four records 235A-D. The invalid attribute value 227 may be replaced by three valid attribute values 231B-D (values 231A and 231D are the same) which may lead to three records 236A-C. The resulting second set of records 240 is shown in FIG. 2.

In step 207 a subset of records of the second set of records 240 that satisfy a consistency condition on the attribute values of each record may be selected.

The consistency condition may for example be a condition for determining whether the combination of attribute values of the attribute 221-224 are consistent. For example, by using a reference dataset, e.g., a reference phone book, association relationships among attribute values may be determined. For example, an association relationship may specify that a phone number starting with "050" should correspond to a state "MB." The consistency condition may comprise a condition for fulfilling one or more of the association relationships. The consistency condition may for example be dependent on the entity of a record such that an entity associated with one more attribute values specific of another entity may not fulfil the consistency condition.

Using the example of FIG. 2, it may be determined that record 235A has an inconsistent combination of attribute values or that the attribute values do not fulfill the consistency condition as described above. This is because the phone number starts with "050"; however, the state is "AB." Using this consistency check records 235A-C and 236A-C may be excluded or removed or skipped for the deduplication to be performed.

The selected subset of records may thus comprise the subset of records 235D and 230C-E, which contains two duplicated records 235D and 230C.

In step 209, the subset of records of the second set of records 240 may be deduplicated or merged in case it comprises more than one record. Using the example of FIG. 2, one of records 235D and 230C may be removed.

FIGS. 3a-3d are text diagrams depicting another example of a set of records at various stages of processing in accordance with an illustrative embodiment.

Figure 3A:
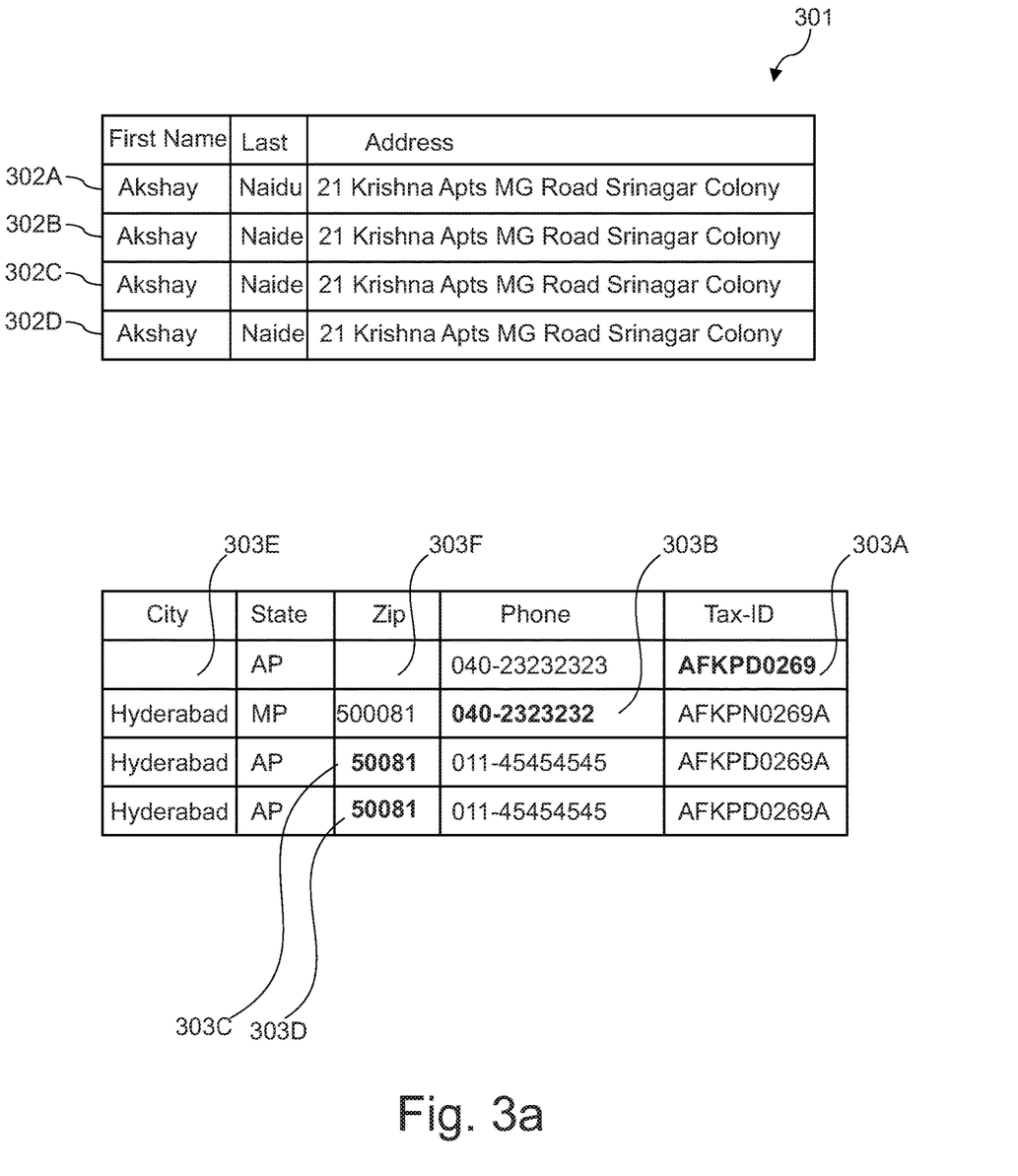

FIG. 3a shows a first set of records 301 with attributes "First Name," "Last," "Address," "City," "State," "Zip," "Phone," and "Tax-ID," including records 302A-302D.

FIG. 3a shows that attribute values 303A-F are invalid. This may be identified by for example comparing the format of the value of "Tax-ID," for example, with a reference format. The attribute values 303A-D are invalid as they do not correspond to reference formats. Attribute values 303E-F are invalids as they are blank values.

FIG. 3b shows the second set of records 305 that result from the replacement of invalid attribute values 303A-F in the first set of records 301. The replacement may be performed as described above by using one or more combination of the valid attribute values.

For example, record 302A has three invalid attribute values 303E-F and 303A. The valid values of the attributes 303A and 303E-F may be obtained using the first set of records 301. For attribute "Zip," a valid value may comprise "500081." For attribute "Tax-ID," a valid value may comprise "AFKPD0269A" or "AFKPN0269A." For attribute "City," a valid value may comprise "Hyderabad." Each of the records 302A-302D comprises values of attributes "First Name," "Last," "Address," "City," "State," "Zip," "Phone," and "Tax-ID."

For replacing the invalid attribute values 303E-F and 303A different combinations of the valid attribute values may be used. For example, a combination of valid attribute values and "AFKPD0269A," "Hyderabad," and "500081" may be used to replace the invalid attribute values 303A and 303E-F, respectively. Another combination of valid attribute values and "AFKPN0269A," "Hyderabad," and "500081" may be used to replace the invalid attribute values 303A and 303E-F, respectively. This may lead to two records resulting from the replacement of invalid attribute values of the record 302A.

Figure 3D:
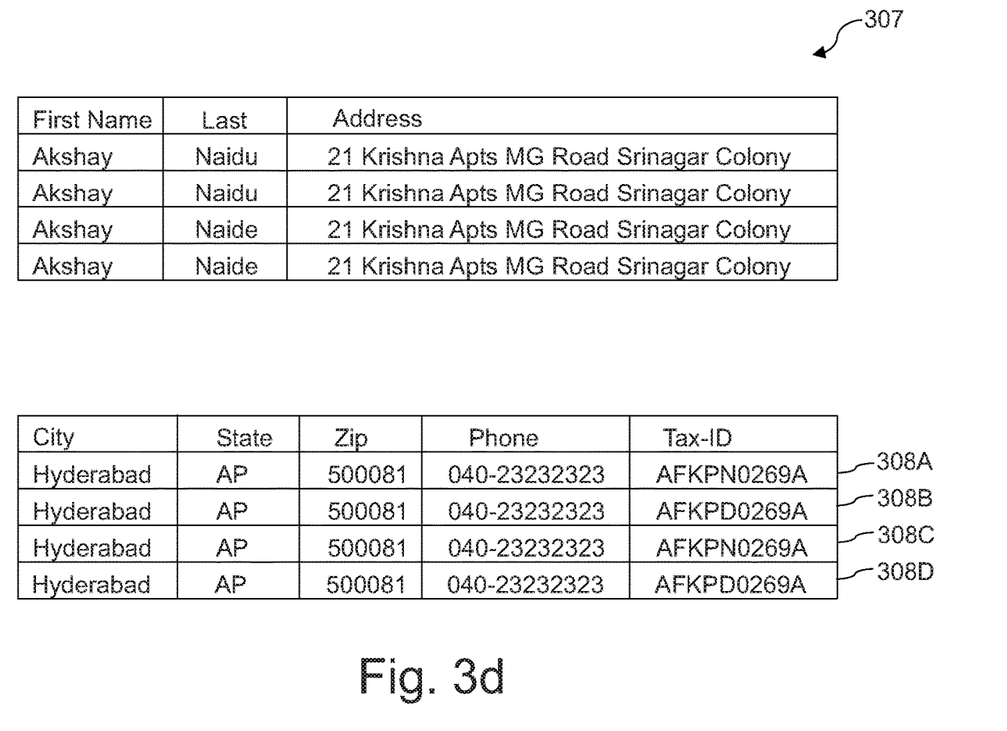

FIG. 3c illustrates some combination of attribute values that may not fulfil consistent condition. For example a consistency condition may be illustrated as "IF city='Hyderabad' then phone mataches_regex '040-[0-9]{6}'". Another consistency condition may comprise "IF city='Hyderabad' then state='AP'". By applying these consistency conditions on the second set of records 305, records 306A-L may be selected or identified. The remaining records of the second set of records 305 that form a subset of records that fulfill the consistency conditions is shown in FIG. 3d.

Figure 3E:
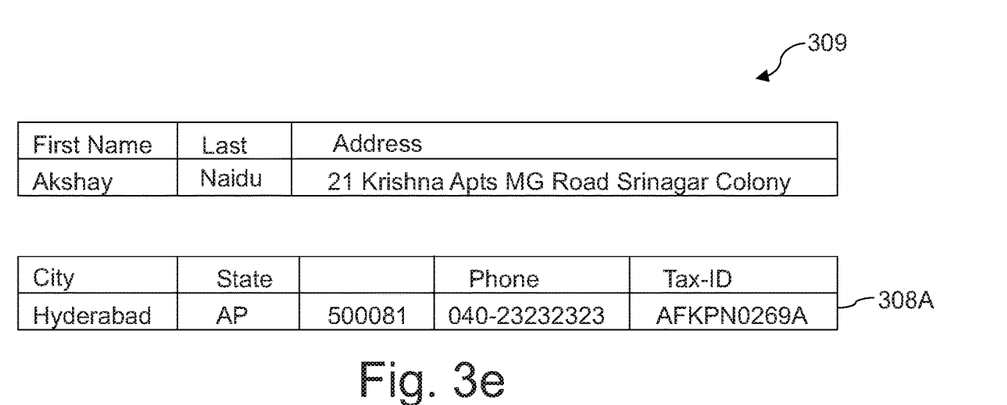

Optionally, further heuristic rules may be performed on the subset of records 307. In another example, these heuristic rules may be performed in step 201. For example, a rule may indicate "5th digit of Tax-ID is the first alphabet of Last Name," which may be violated by records 308A and 308C. Another rule may require comparing the combination of the first and last name with a lookup table containing the first and last names. "Last" refers to "Last Name" "Naidu" exists in the lookup table but "Naide" does not. This comparison would then exclude the records 308C-D as not satisfying the comparison or the matching with the lookup table. The record 308A is shown in FIG. 3e as the resulting record 309 that survived the selections performed before. Since it is a single record there may be no need for the deduplication or merging and may be provided as the result of the deduplication.

In another example a method for deduplicating a set of data records is provided. The method comprises: receiving a plurality of data records, each data record having a set of attributes; grouping the plurality of data records into entity-specific sets of data records by using a matching algorithm; providing data consistency (data quality) rules for the plurality of data records; creating combinations of attribute values present in the data records belonging to an entity specific set, resulting in entity-specific sets of golden record candidates, wherein the combinations of attribute values exclude attribute values not satisfying the data consistency rules; comparing the golden records candidates to data quality consistency rules and maintaining in each entity-specific set of golden record candidates at least one golden record candidate violating no, or a minimum number of data consistency rules; if the entity-specific sets of golden record candidates contain more than one golden record candidate, executing a merging algorithm using predefined merging rules.

Aspects of the illustrative embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for deduplicating a set of records of data, each record of the set of records having a set of attributes, the method comprising:
    receiving the set of records by receiving a data table from storage, wherein the data table comprises one or more columns each represent a respective attribute and one or more rows each representing an attribute value;
    identifying a subset of records of the set of records each having one or more invalid attribute values by retrieving heuristic rules to determine a likelihood that an attribute value is an invalid value and applying the heuristic rules to each of the attribute values;
    determining for each invalid attribute value of a given attribute of the subset of the set of records one or more associated valid candidates of attribute values of the given attribute using the set of records, wherein determining for a given invalid attribute value one or more associated valid candidates of attribute values comprises selecting records of the set of records having a same super key as the record comprising the given invalid attribute value and determining the one or more associated valid candidates of the attribute values using the selected records;
    for each record of the subset of records of the set of records:
        replacing the one or more invalid attribute values by one or more combinations of the determined valid candidates of attribute values resulting in a modified set of records;
        selecting a subset of records of the modified set of records that satisfy a consistency condition on the attribute values of each record, wherein the consistency condition comprises a rule for determining whether the attribute values of each record are consistent;
        deduplicating, in the data table in the storage, the subset of records of the modified set of records responsive to determining the subset of records of the modified set of records comprises more than one record.

2. The method of claim 1, further comprising disregarding the inconsistent records by removing the inconsistent records or skipping the inconsistent records fir performing the deduplicating.

3. The method of claim 1, further comprising: before identifying the subset of records of the set of records, comparing for each record of the set of records the attribute values of a super key of the record with predefined reference values of the super key and correcting the attribute values responsive to an unsuccessful comparison.

4. The method of claim 1, the heuristic rules being generated for performing a data quality analysis of the set of records.

5. The method of claim 1, further comprising:
    providing a reference dataset;
    determining association relationships among attribute values of the reference dataset, wherein the consistency condition comprises a condition for fulfilling one of the association relationships.

6. The method of claim 5, the reference dataset comprising the remaining non-identified subset of records of the set of records.

7. The method of claim 1, the consistency condition being a selected rule of a set of heuristic rules on multiple attributes of the set of attributes.

8. The method of claim 1, the one or more associated valid candidates attribute values comprising all valid attribute values of the given attribute in the set of records.

9. The method of claim 1, the one or more associated valid candidates of attribute values comprising a selected portion of valid attribute values of the given attribute in the set of records.

10. The method of claim 1, the set of records comprising duplicate records only.

11. The method of claim 1, the invalid attribute value comprising one of:
   a blank value;
   a null value;
   an out of range value;
   a wrong type value;
   a value violating a predefined domain condition;
   a value violating user defined data quality rifles;
   an infrequent value;
   an outlier value; or
   a value different from a predefined value.

* * * * *